United States Patent
Rozman et al.

(10) Patent No.: US 10,601,338 B2
(45) Date of Patent: Mar. 24, 2020

(54) ELECTRIC SYSTEM ARCHITECTURE FOR A VEHICLE WITH MULTIPLE LOAD CHARACTERISTICS

(71) Applicant: Hamilton Sundstrand Corporation, Charlotte, NC (US)

(72) Inventors: Gregory I. Rozman, Rockford, IL (US); Steven J. Moss, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 215 days.

(21) Appl. No.: 15/714,746

(22) Filed: Sep. 25, 2017

(65) Prior Publication Data

US 2019/0097546 A1 Mar. 28, 2019

(51) Int. Cl.

| | |
|---|---|
| H02M 7/483 | (2007.01) |
| H02M 5/44 | (2006.01) |
| H02M 3/155 | (2006.01) |
| H02M 7/23 | (2006.01) |
| H02J 3/36 | (2006.01) |
| H02M 1/00 | (2006.01) |
| H02M 3/158 | (2006.01) |

(52) U.S. Cl.
CPC ............... *H02M 7/483* (2013.01); *H02J 3/36* (2013.01); *H02M 3/155* (2013.01); *H02M 5/44* (2013.01); *H02M 7/23* (2013.01); *B60L 2210/40* (2013.01); *H02M 2001/007* (2013.01); *H02M 2001/008* (2013.01); *H02M 2003/1586* (2013.01)

(58) Field of Classification Search
None
See application file for complete search history.

(56) References Cited

U.S. PATENT DOCUMENTS

| | | | |
|---|---|---|---|
| 4,739,466 | A | 4/1988 | Glennon |
| 5,936,855 | A | 8/1999 | Salmon |
| 6,108,223 | A | 8/2000 | Julian |

(Continued)

FOREIGN PATENT DOCUMENTS

| | | |
|---|---|---|
| CN | 201061153 | 5/2008 |
| JP | 2008278567 | 11/2008 |
| JP | 2014027715 | 2/2014 |

OTHER PUBLICATIONS

USPTO, Non-Final Office Action dated May 29, 2019 in U.S. Appl. No. 15/713,273.

(Continued)

*Primary Examiner* — Abdhesh K Jha
(74) *Attorney, Agent, or Firm* — Snell & Wilmer, L.L.P.

(57) ABSTRACT

An electric power system (EPS) may comprise a first power conversion channel and a second power conversion channel connected in parallel with a permanent magnet synchronous machine (PMSM). The first power conversion channel may be suitable for a load having a first electronic characteristic. The second power conversion channel may be suitable for a load having a second electronic characteristic. The first power conversion channel may comprise a first rectifier configured to receive an alternating current (AC) power from the PMSM and rectify the AC power into a first direct current (DC) power, a first buck converter configured to receive the first DC power from the first rectifier and reduce a voltage of the first DC power, and a first output filter configured to filter the first DC power and supply the first DC power to a first load.

16 Claims, 6 Drawing Sheets

(56) References Cited

U.S. PATENT DOCUMENTS

| | | |
|---|---|---|
| 6,239,582 B1 | 5/2001 | Buzan |
| 6,700,242 B2 | 3/2004 | Kawamura |
| 7,830,686 B2 | 11/2010 | Zeng et al. |
| 8,427,116 B2 | 4/2013 | Rozman et al. |
| 8,432,137 B2 | 4/2013 | Rozman et al. |
| 2002/0047448 A1 | 4/2002 | Kawamura |
| 2002/0084705 A1 | 7/2002 | Kawamura |
| 2002/0097027 A1 | 7/2002 | Asao |
| 2003/0075997 A1 | 4/2003 | Keim |
| 2006/0152085 A1 | 7/2006 | Flett |
| 2006/0273766 A1 | 12/2006 | Kawamura |
| 2008/0315584 A1 | 12/2008 | Rozman |
| 2009/0261586 A1 | 10/2009 | Maddali |
| 2010/0320863 A1 | 12/2010 | Nishimura |
| 2011/0155703 A1 | 6/2011 | Winn |
| 2012/0126758 A1 | 5/2012 | Fang |
| 2014/0266079 A1 | 9/2014 | Rozman |
| 2015/0194877 A1 | 7/2015 | Hsiao et al. |
| 2016/0322924 A1 | 11/2016 | Oriol et al. |
| 2017/0070150 A1 | 3/2017 | Kim |
| 2017/0359009 A1 | 12/2017 | Rozman |

OTHER PUBLICATIONS

Rozman et al., U.S. Appl. No. 15/713,273, filed Sep. 22, 2017, entitled "Voltage Regulation of Permanent Magnet Generator With Extended Speed Range".

USPTO, Pre-Interview First Office Action dated Sep. 27, 2018 in U.S. Appl. No. 15/713,273.

USPTO, First Action Interview Office Action dated Nov. 7, 2018 in U.S. Appl. No. 15/713,273.

European Patent Office, European Search Report dated Jan. 24, 2019 in Application No. 18196029.5.

Yigeng Huangfu et al: "High Power Efficiency Buck Converter Design for Standalone Wind Generation System", International Journal of Antennas and Propagation, vol. 2015, Jan. 1, 2015 (Jan. 1, 2015), pp. 1-9.

USPTO, Advisory Action dated Apr. 12, 2019 in U.S. Appl. No. 15/713,273.

European Patent Office, European Search Report dated Jan. 2, 2019 in Application No. 18195657.4.

USPTO, Final Office Action dated Jan. 30, 2019 in U.S. Appl. No. 15/713,273.

USPTO, Final Office Action dated Aug. 14, 2019 in U.S. Appl. No. 15/713,273.

USPTO, Advisory Action dated Oct. 15, 2019 in U.S. Appl. No. 15/713,273.

ELECTRIC SYSTEM ARCHITECTURE FOR A VEHICLE WITH MULTIPLE LOAD CHARACTERISTICS

FIELD

The disclosure generally relates to electrical power systems, and more particularly to the design of an electrical power generating system for a vehicle.

BACKGROUND

Vehicles, including ground vehicles and underwater vehicles, have migrated toward hybrid electric technology using high voltage direct current (HVDC) distribution with subsequent power conversion to a lower voltage to power lower voltage loads. A permanent magnet synchronous machine (PMSM) may be used to generate electric power for an electronic power system. A PMSM typically includes a stator winding and a rotor with permanent magnets (PMs) to generate a single three-phase voltage. The three-phase voltage may be outputted to a rectifier for conversion to a DC voltage. Some vehicles, in addition to base and slowly changing loads, may contain high power pulse loads.

SUMMARY

In various embodiments, an electric power system (EPS) is provided, comprising a permanent magnet synchronous machine (PMSM), a first rectifier configured to receive an alternating current (AC) power from the PMSM and rectify the AC power into a first direct current (DC) power, a first buck converter configured to receive the first DC power from the first rectifier and reduce a voltage of the first DC power, and a first output filter configured to filter the first DC power and supply the first DC power to a first load.

In various embodiments, the EPS further comprises a second rectifier coupled in parallel with the first rectifier and configured to receive the AC power and rectify the AC power into a second DC power, and a second buck converter connected in series with the second rectifier.

In various embodiments, the first buck converter is connected in series with the first output filter and the second buck converter is connected in series with the first output filter.

In various embodiments, the EPS further comprises a third current transducer connected between the second buck converter and the first output filter.

In various embodiments, the EPS further comprises a third buck converter connected in parallel with the second buck converter, and a second output filter connected in series with the second buck converter and configured to supply the second DC power to a second load.

In various embodiments, the EPS further comprises a fourth current transducer connected between the second output filter and the second load.

In various embodiments, the EPS further comprises a fourth buck converter connected in parallel with the third buck converter.

In various embodiments, the EPS further comprises a second rectifier coupled in parallel with the first rectifier and configured to receive the AC power and rectify the AC power into a second DC power, an H-bridge connected in series with the second rectifier, a galvanically isolated transformer connected in series with the H-bridge, and a second output filter connected in series with the galvanically isolated transformer and configured to supply the second DC power to a second load.

In various embodiments, the EPS further comprises a third current transducer connected between the galvanically isolated transformer and the second output filter, and a fourth current transducer connected between the second output filter and the second load.

In various embodiments, the EPS further comprises a first current transducer connected between the first buck converter and the first output filter, and a second current transducer connected between the first output filter and the first load, wherein the first output filter comprises a first inductor, a second inductor, a third inductor, a fourth inductor, a first resistor, a second resistor, and at least one capacitor, and wherein the first buck converter comprises a transistor, a diode, an inductor, and a capacitor.

In various embodiments, an electric power system (EPS) is provided, comprising, a permanent magnet synchronous machine (PMSM) configured to generate an AC power, a first power conversion channel connected to the PMSM and configured to receive the AC power, a second power conversion channel connected to the PMSM and configured to receive the AC power, wherein the first power conversion channel and the second power conversion channel are connected in parallel, the first power conversion channel configured to generate a first DC power utilizing the AC power, and the second power conversion channel configured to generate a second DC power utilizing the AC power.

In various embodiments, the first power conversion channel comprises a first rectifier configured to generate the first DC power utilizing the AC power, and the second power conversion channel comprises a second rectifier configured to generate the second DC power utilizing the AC power.

In various embodiments, the first power conversion channel comprises a first buck converter configured to reduce a voltage of the first DC power, and the second power conversion channel comprises a second buck converter configured to reduce a voltage of the second DC power.

In various embodiments, the first DC power and the second DC power are received by a first load.

In various embodiments, the EPS further comprises a first load configured to receive the first DC power, and a second load configured to receive the second DC power, wherein the first DC power comprises a first power and the second DC power comprises a second power, the second power being greater than the first power.

In various embodiments, the second power conversion channel further comprises a third buck converter coupled in parallel with the second buck converter.

In various embodiments, the second power conversion channel further comprises a fourth buck converter coupled in parallel with the second buck converter.

In various embodiments, the first power conversion channel comprises a first voltage and the second power conversion channel comprises a second voltage.

In various embodiments, the first power conversion channel comprises a first buck converter configured to reduce a voltage of the first DC power, and a first load configured to receive the first DC power, and the second power conversion channel comprises, an H-bridge connected in series with the second rectifier, a galvanically isolated transformer connected in series with the H-bridge, and a second load configured to receive the second DC power, wherein the first DC power comprises a first power and the second DC power comprises a second power, the second power being greater than the first power.

A method for generating electric power is provided, comprising, rotating a rotor of a permanent magnet synchronous machine (PMSM), generating an AC power in response to the rotating, generating a first DC power utilizing the AC power, wherein the first DC power comprises a first power, and generating a second DC power utilizing the AC power, wherein the second DC power comprises a second power, wherein the second power is greater than the first power.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Conventional electric power system (EPS) architectures for a vehicle typically utilize a common high voltage direct current (DC) bus, such as six hundred volts (600 Vdc) with subsequent power conversion to lower voltage, such as twenty-eight volts (28 Vdc) to power lower voltage loads. Some vehicles in addition to base and slowly changing loads may contain high power pulse loads typically associated with laser or sonar operation. For these types of loads, conventional electric system architecture may benefit from improvements to achieve higher power density, specific power, and efficiency.

In this regard, EPSs of the present disclosure may result in improved packaging by reducing the size of power devices included in the rectifiers, buck converters, and/or filter, due to their decreased power rating. EPSs of the present disclosure may result in improved power density and/or specific power. EPSs of the present disclosure may result in improved efficiency. EPSs of the present disclosure may result in improved power quality on the power conversion channel.

Figure 1:
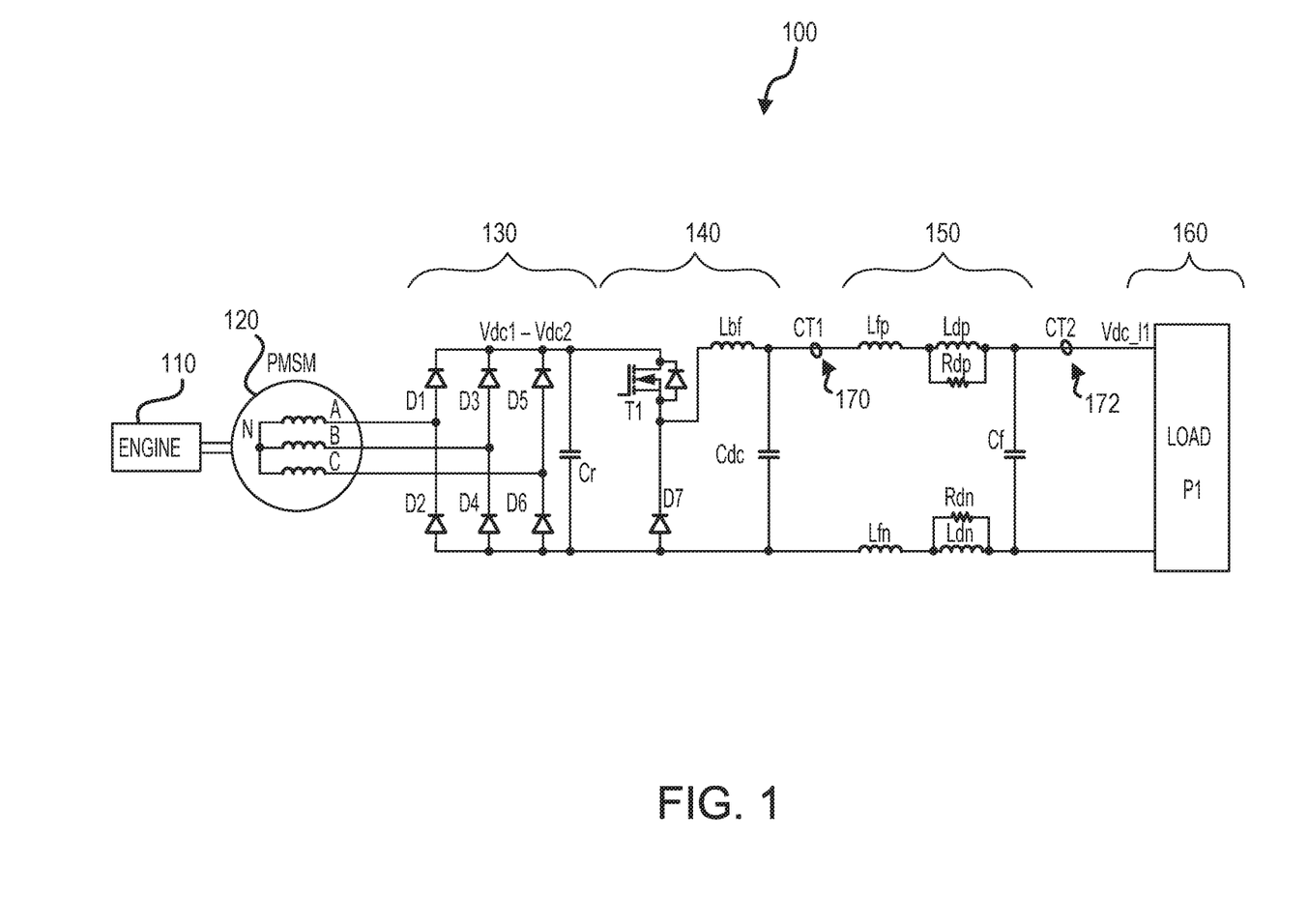
FIG. 1 illustrates a schematic view of an electric power system (EPS) having a single power conversion channel, in accordance with various embodiments.

With reference to FIG. 1, a schematic view of an electric power system (EPS) 100 is illustrated, in accordance with various embodiments. EPS 100 may include an engine 110, a permanent magnet synchronous machine (PMSM) 120, a rectifier (also referred to herein as a first rectifier) 130, a buck converter (also referred to herein as a first buck converter) 140, a first current transducer 170, a second current transducer 172, an output filter 150, and a load 160. In various embodiments, rectifier 130, buck converter 140, and output filter 150 may be connected in series.

In various embodiments, engine 110 may comprise a gas engine, a diesel engine, a gas turbine engine, or any other suitable engine for rotating a rotor of PMSM 120. PMSM 120 may include a rotor and a stator. The rotor may be driven by engine 110. PMSM 120 may generate electric power in response to rotation of the rotor. This electric power may be rectified from an alternating current (AC) power into a direct current (DC) power by rectifier 130. The DC voltage of this electric power may be reduced by buck converter 140, while increasing the current of said electric power. This electric power may pass through output filter 150 to load 160.

In various embodiments, rectifier 130 may comprise a passive rectifier. Rectifier 130 may comprise a six-pulse rectifier, comprising six diodes (D1, D2, D3, D4, D5, and D6). Rectifier 130 may comprise a rectifier capacitor (Cr) coupled in parallel with said diodes. The output voltage of rectifier 130 may be dependent upon the rotational speed of the rotor of PMSM 120. In various embodiments, rectifier 130 may be configured to output a voltage of between Vdc1 and Vdc2, such as between three hundred volts and six hundred volts (300 Vdc-600 Vdc) for example.

In various embodiments, buck converter 140 may be connected across rectifier capacitor (Cr). Buck converter 140 may comprise a transistor (T1). Transistor (T1) may comprise an insulated-gate bipolar transistors (IGBTs) and/or metal-oxide semiconductor field-effect transistors (MOSFETs). Transistor (T1) may comprise a transistor/diode pair. Buck converter 140 may comprise a diode (D7). Buck converter 140 may comprise an inductor (Lbf). Buck converter 140 may comprise a capacitor (Cdc). Transistor (T1) may be electronically controlled to open and/or close the circuit, thereby controlling the electric power received by load 160. Load 160 may utilize an electric power, P1, such as, for example, ten kilowatts (10 kW). PMSM 120 may produce an electric power comprising a voltage of between, for example, 300 volts and 600 volts (300 Vdc-600 Vdc). Buck converter 140 may reduce this voltage to a voltage, Vdc_l1 (also referred to herein as a first voltage). Voltage Vdc_l1 may comprise, in accordance with various embodiments, a voltage of between 28 volts and 300 volts (28 Vdc-300 Vdc), and in various embodiments, a voltage of between 120 volts and 275 volts (120 Vdc-275 Vdc), and in various embodiments, a voltage of two hundred and seventy volts (270 Vdc). In various embodiments, voltage Vdc_l1 may comprise a voltage which is less than the output voltage of PMSM 120. In various embodiments, voltage Vdc_l1 may comprise a voltage which is less than Vdc2.

In various embodiments, first current transducer 170 may be coupled between buck converter 140 and output filter 150. Second current transducer 172 may be coupled between output filter 150 and load 160. First current transducer 170 and second current transducer 172 may be used to improve voltage regulation of the power conversion channel during various power demands of load 160. For example, load 160 may include base loads, slow changing loads, and pulse loads, such as loads associated with operation of a laser, radar, or sonar.

Output filter 150 may comprise inductor Lfp, inductor Ldp, inductor, Lfn, inductor Ldn, resistor Rdp, resistor Rdn, and filter capacitor Cf. Inductor Lfp may be connected in series with resistor Rdp and inductor Ldp. Resistor Rdp and inductor Ldp may be connected in parallel. Inductor Lfn may be connected in series with resistor Rdn and inductor Ldn. Resistor Rdn and inductor Ldn may be connected in parallel. Filter capacitor Cf may be connected in parallel with the load 160. Output filter 150 may improve the quality of the DC output voltage.

In various embodiments, load 160 may receive the filtered DC output voltage. Load 160 may be connected across output filter 150. In various embodiments, load 160 may comprise a mid-level voltage load such as, for example, a load configured to receive two hundred and seventy volts (270 Vdc). Load 160 may be configured to receive a power such as, for example, a ten kilowatt (10 kW) power.

Figure 2:
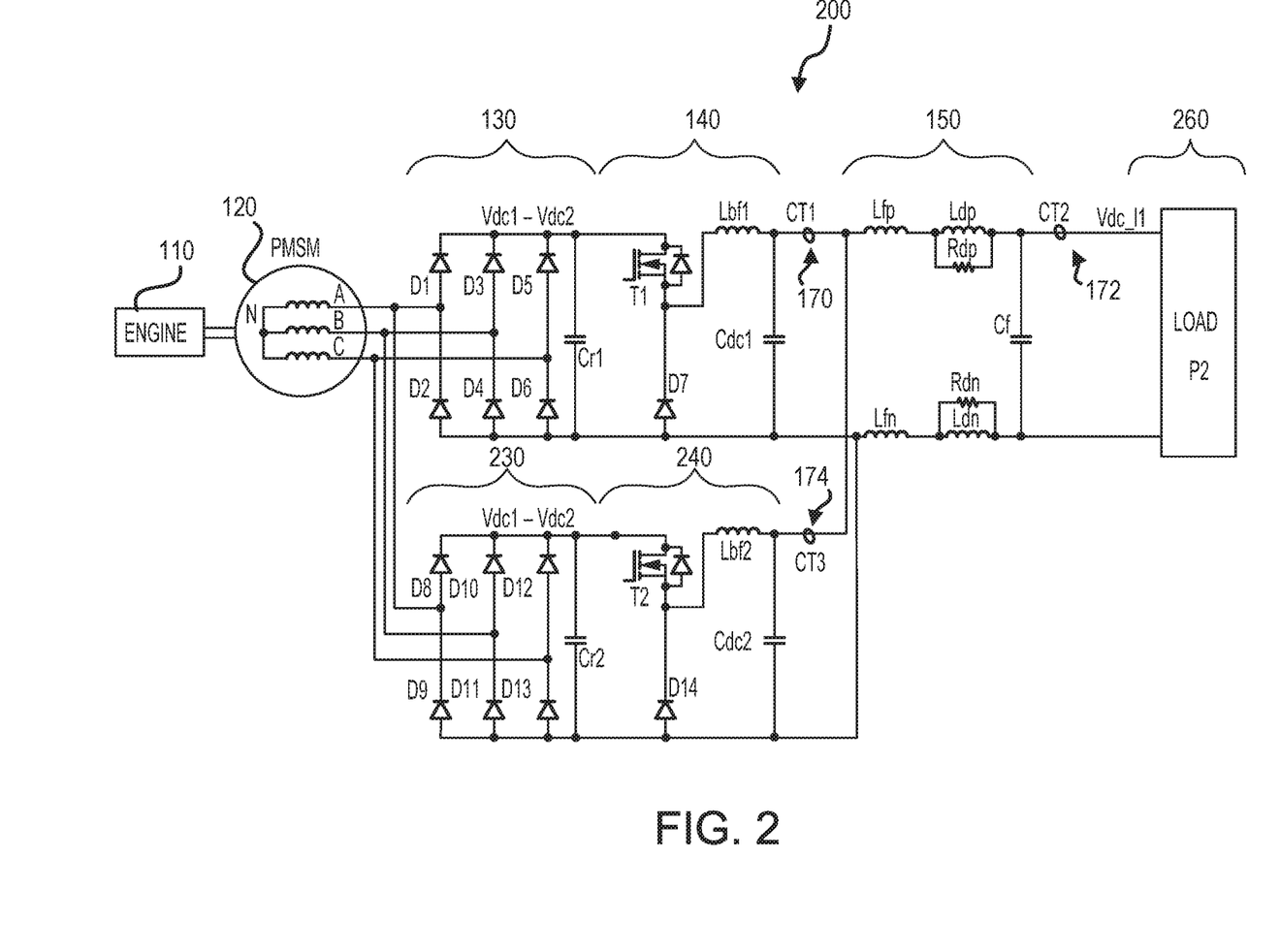
FIG. 2 illustrates a schematic view of an EPS having a first power conversion channel and a second power conversion channel supplying electric power to a common load, in accordance with various embodiments.

With respect to FIG. 2, elements with like element numbering, as depicted in FIG. 1, are intended to be the same and will not necessarily be repeated for the sake of clarity.

With reference to FIG. 2, a schematic view of an EPS 200 is illustrated, in accordance with various embodiments. EPS 200 may be similar to EPS 100, with momentary reference to FIG. 1, except that EPS 200 further includes a second rectifier 230, a second buck converter 240, and a third current transducer 174 connected in parallel with first rectifier 130, first buck converter 140, and first current transducer 170. In this regard, rectifier 230 and buck converter 240 may be connected in series. Furthermore, EPS 200 may be different from EPS 100 in that load 260 may be configured to receive a higher power than load 160. For example, load 260 may be configured to receive a second power, such as a twenty-five kilowatt (25 kW) power for example. Stated differently, load 260 may utilize an electric power, P2, such as, for example, twenty-five kilowatts (25 kW). In this regard, EPS 200 utilizes two similar channels connected in parallel and interconnected at the input of the output filter 150 and in so doing increasing the power of the output power received by the load 260. The pulse width modulating (PWM) switching frequency of transistor T1 may be phase shifted by 180 degrees in relationship to the PWM switching frequency of transistor T2. This phase shift may reduce the output ripple current which may minimize the side of individual components, allow improved packaging, and optimized form factor.

Figure 3:
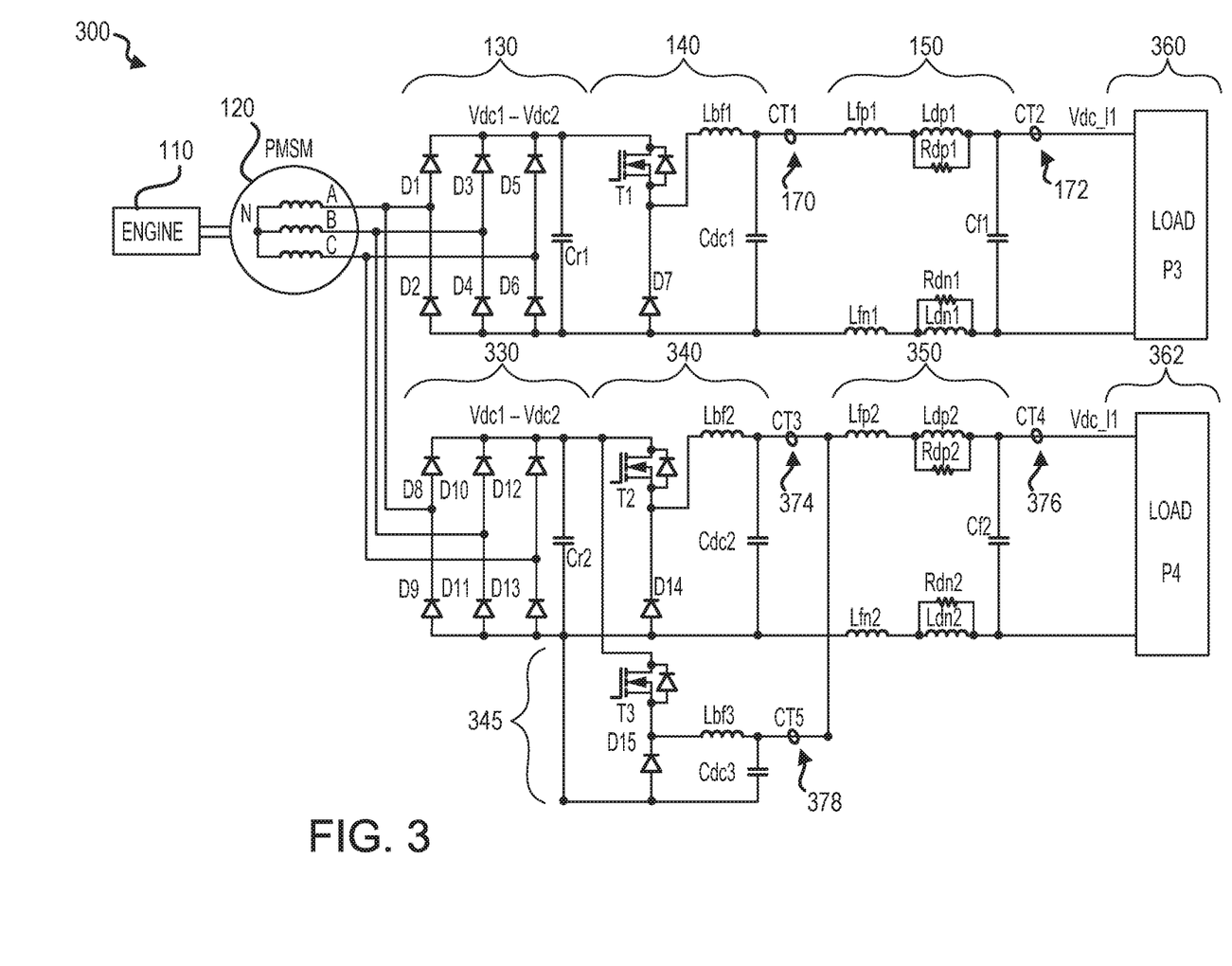
FIG. 3 illustrates a schematic view of an EPS having a first power conversion channel supplying electric power to a first load and a second power conversion channel supplying electric power to a second load, wherein the first load receives a first direct current (DC) power having a first power and the second load receives a DC power having a second power, in accordance with various embodiments.

With respect to FIG. 3, elements with like element numbering, as depicted in FIG. 1, are intended to be the same and will not necessarily be repeated for the sake of clarity.

With reference to FIG. 3, a schematic view of an EPS 300 is illustrated, in accordance with various embodiments. EPS 300 may be similar to EPS 100, with momentary reference to FIG. 1, except that EPS 300 further includes a second rectifier 330, a second buck converter 340, a second output filter 350, and a third buck converter 345, connected in parallel with first rectifier 130, first buck converter 140, and first output filter 150.

EPS 300 may include a first load 360 configured to receive electric power from first output filter 150 and a second load 362 configured to receive electric power from second output filter 350. First load 360 may be configured to receive a lower power than load 362. For example, first load 360 may utilize an electric power, P3, such as, for example, seven kilowatts (7 kW) and load 362 may utilize an electric power, P4, such as, for example, eighteen kilowatts (18 kW). In this regard, first rectifier 130 and second rectifier 330 may utilize the same AC power generated by PMSM 120 and each rectify said AC power into separate DC powers. Stated differently, first rectifier 130 may rectify the AC power into a first DC power received by first buck converter 140 and second rectifier 330 may rectify the AC power into a second DC power received by second buck converter 340.

EPS 300 may further include a third current transducer 374 connected between second buck converter 340 and second output filter 350, a fourth current transducer 376 connected between second output filter 350 and second load 362, and a fifth current transducer 378 connected between third buck converter 345 and second output filter 350. Third buck converter 345 may be coupled in parallel with second buck converter 340.

In various embodiments, first rectifier 130, first buck converter 140, and first output filter 150 (collectively referred to herein as a first power conversion channel) may be configured to support base and slow changing loads. The first power conversion channel may be sensitive to the power quality on the channel, such as voltage ripple and voltage transients during load application and removal for example. In various embodiments, second rectifier 330, second buck converter 340, third buck converter 345, and second output filter 350 (collectively referred to herein as a second power conversion channel) may be configured to support high power pulse loads. Interleaved second buck converter 340 and third buck converter 345 may utilize a common 6-pulse rectifier and capacitor (i.e., second rectifier 330). Separation of power converter to support two different loads may minimize interaction between loads and improve overall power quality for each of the power conversion channels.

Figure 4:
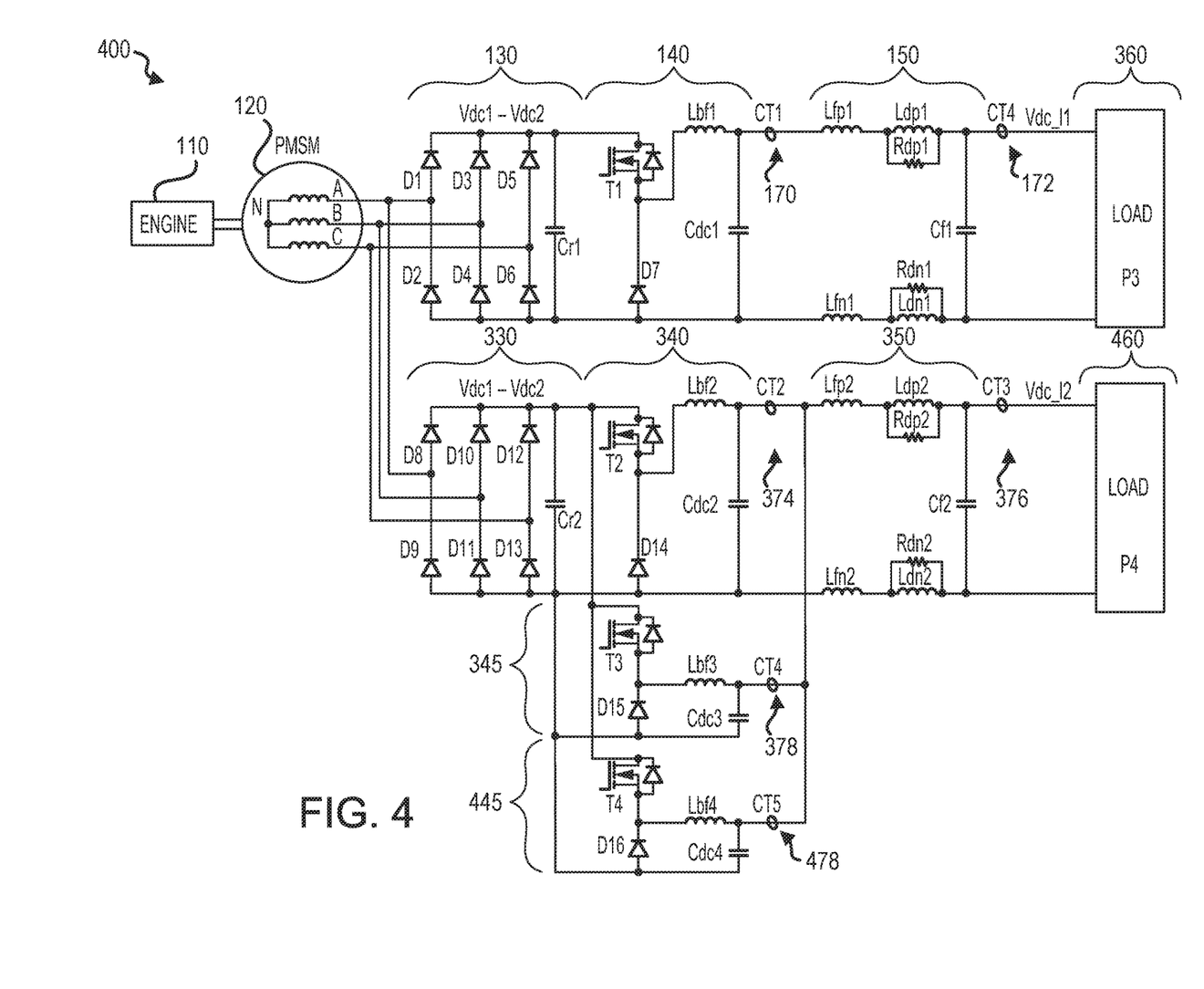
FIG. 4 illustrates a schematic view of an EPS having a first power conversion channel supplying electric power to a first load and a second power conversion channel supplying electric power to a second load, wherein the first load receives a first direct current (DC) power having a first voltage and a first power and the second load receives a DC power having a second voltage and a second power, in accordance with various embodiments.

With respect to FIG. 4, elements with like element numbering, as depicted in FIG. 3, are intended to be the same and will not necessarily be repeated for the sake of clarity.

With reference to FIG. 4, a schematic view of an EPS 400 is illustrated, in accordance with various embodiments. EPS 400 may be similar to EPS 300, with momentary reference to FIG. 3, except that EPS 400 further includes a fourth buck converter 445 connected in parallel with third buck converter 345. EPS 400 may further include a fifth current transducer 478 connected between fourth buck converter 445 and second output filter 350.

In various embodiments, load 460 may utilize a reduced voltage, Vdc_l2 (also referred to herein as a second voltage), for the same output power when compared to load 360, with momentary reference to FIG. 3, and, therefore, may utilize higher output current. In various embodiments, the reduced voltage Vdc_l2 may be, for example, one hundred and twenty volts (120 Vdc). To achieve increased output current, fourth buck converter 445 may be added to EPS 400 with phase shifting of PWM switching frequency by 120° between second buck converter 340, third buck converter 345, and fourth buck converter 445.

Figure 5:
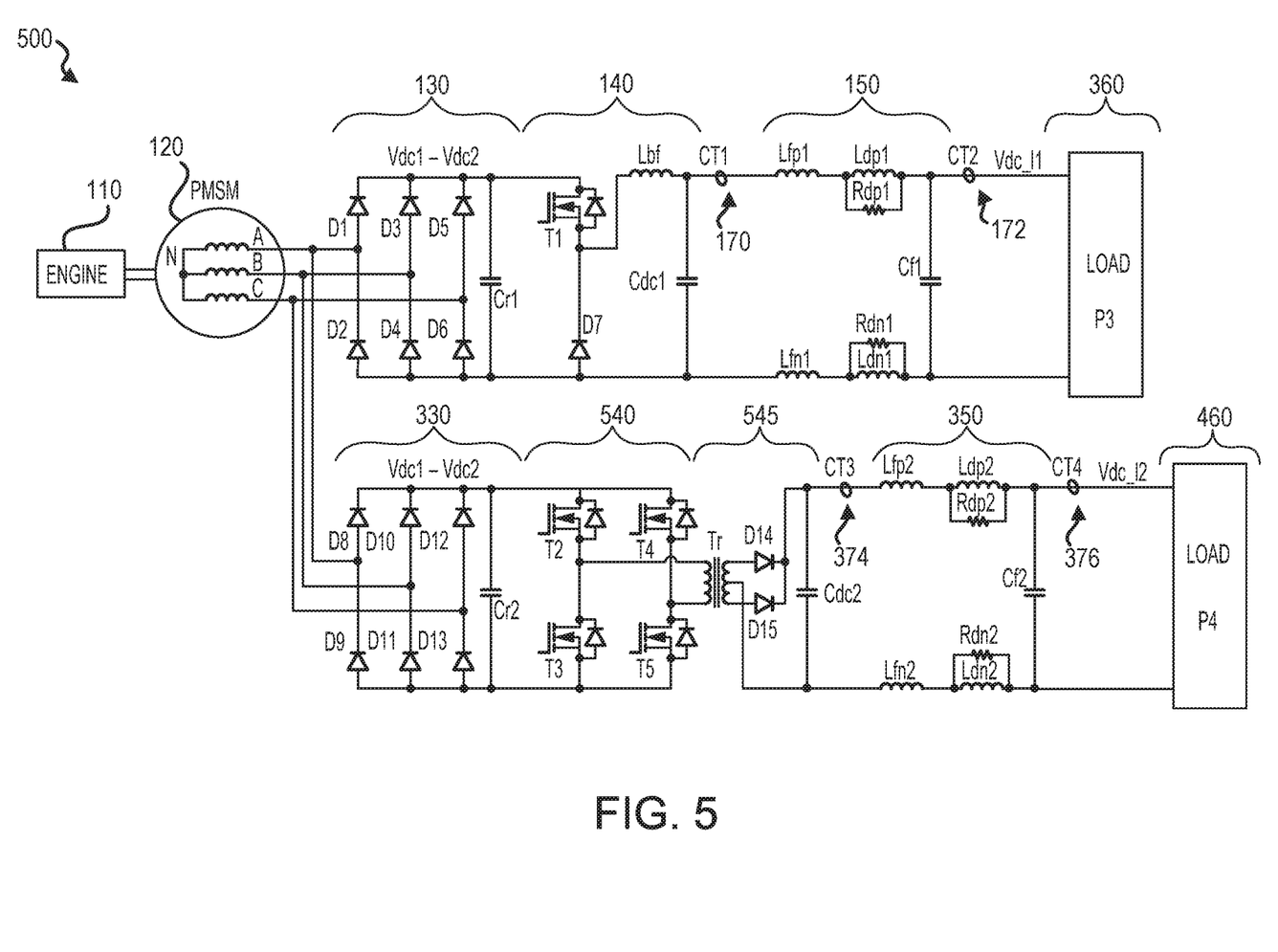
FIG. 5 illustrates a schematic view of an EPS having a first power conversion channel supplying electric power to a first load and a second power conversion channel supplying electric power to a second load, wherein the second power conversion channel is galvanically isolated from the first power conversion channel.

With respect to FIG. 5, elements with like element numbering, as depicted in FIG. 4, are intended to be the same and will not necessarily be repeated for the sake of clarity.

With reference to FIG. 5, a schematic view of an EPS 500 is illustrated, in accordance with various embodiments. EPS 500 may be similar to EPS 400, with momentary reference to FIG. 4, except that instead of utilizing three interleaved buck converters on the second power conversion channel, EPS 500 may utilize a galvanically isolated transformer 545 coupled between second rectifier 330 and second output filter 350. EPS 500 may further include an H-bridge 540 whereby the output voltage received by load 360 may be controlled. In this regard, EPS 500 may utilize two galvanically isolated DC channels. Galvanic isolated between channels may minimize interaction between loads and improve overall power quality for each of the power conversion channels.

Figure 6:
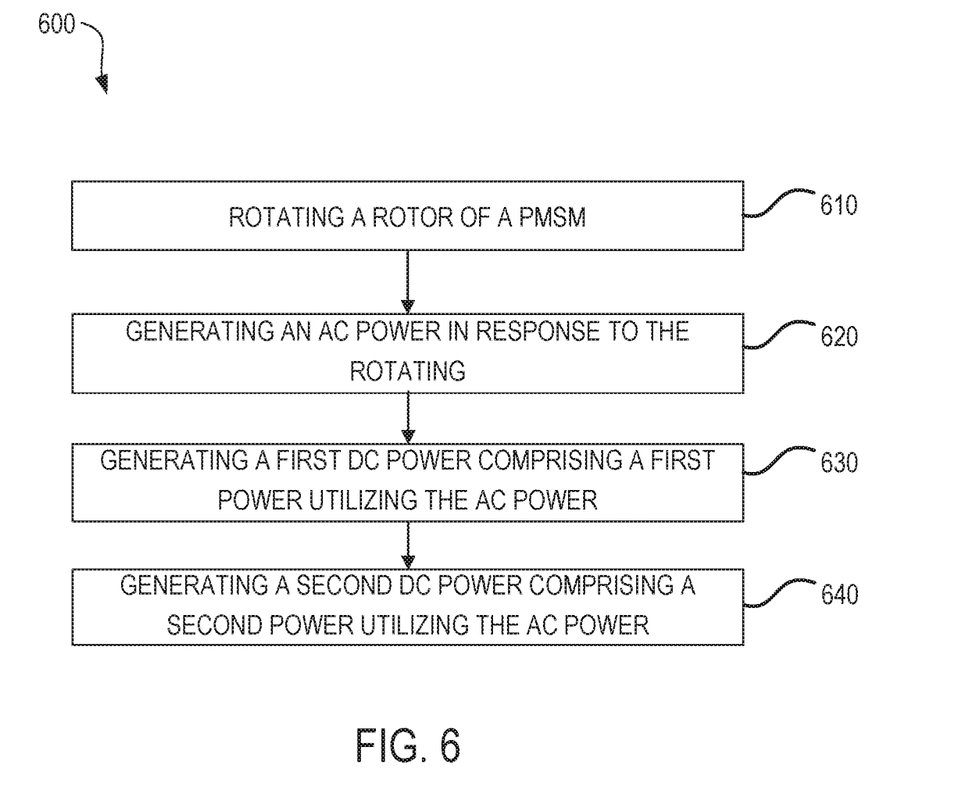
FIG. 6 illustrates a method for generating electric power, in accordance with various embodiments.

With reference to FIG. 6, a method 600 for generating electric power is provided, in accordance with various embodiments. Method 600 includes rotating a rotor of a PMSM (step 610). Method 600 includes generating an AC power in response to the rotating (step 620). Method 600 includes generating a first DC power comprising a first power utilizing the AC power (step 630). Method 600 includes generating a second DC power comprising a second power utilizing the AC power (step 640). The second power may be greater than the first power.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric power system (EPS), comprising:
   a permanent magnet synchronous machine (PMSM);
   a first rectifier configured to receive an alternating current (AC) power from the PMSM and rectify the AC power into a first direct current (DC) power;
   a first buck converter configured to receive the first DC power from the first rectifier and reduce a voltage of the first DC power;
   a first output filter configured to filter the first DC power and supply the first DC power to a first load;
   a second rectifier coupled in parallel with the first rectifier and configured to receive the AC power and rectify the AC power into a second DC power;
   an H-bridge connected in series with the second rectifier;
   a galvanically isolated transformer connected in series with the H-bridge; and
   a second output filter connected in series with the galvanically isolated transformer and configured to supply the second DC power to a second load.

2. The EPS of claim 1, further comprising: a second buck convertor connected in series with the second rectifier.

3. The EPS of claim 2, wherein the first buck converter is connected in series with the first output filter and the second buck converter is connected in series with the first output filter.

4. The EPS of claim 3, further comprising a third current transducer connected between the second buck converter and the first output filter.

5. The EPS of claim 2, further comprising: a third buck converter connected in parallel with the second buck converter; and the second output filter connected in series with the second buck converter and configured to supply the second DC power to the second load.

6. The EPS of claim 5, further comprising a fourth current transducer connected between the second output filter and the second load.

7. The EPS of claim 5, further comprising a fourth buck converter connected in parallel with the third buck converter.

8. The EPS of claim 1, further comprising:
a third current transducer connected between the galvanically isolated transformer and the second output filter; and
a fourth current transducer connected between the second output filter and the second load.

9. The EPS of claim 1, further comprising:
a first current transducer connected between the first buck converter and the first output filter; and
a second current transducer connected between the first output filter and the first load;
wherein the first output filter comprises a first inductor, a second inductor, a third inductor, a fourth inductor, a first resistor, a second resistor, and at least one capacitor, and
wherein the first buck converter comprises a transistor, a diode, an inductor, and a capacitor.

10. An electric power system (EPS) comprising:
a permanent magnet synchronous machine (PMSM) configured to generate an alternating current (AC) power;
a first power conversion channel connected to the PMSM and configured to receive the AC power;
a second power conversion channel connected to the PMSM and configured to receive the AC power;
wherein the first power conversion channel and the second power conversion channel are connected in parallel,
the first power conversion channel configured to generate a first DC power utilizing the AC power,
the second power conversion channel configured to generate a second DC power utilizing the AC power;
the first power conversion channel comprises a first rectifier configured to generate the first DC power utilizing the AC power, and the second power conversion channel comprises a second rectifier configured to generate the second DC power utilizing the AC power,
the first power conversion channel comprises:
a first buck converter configured to reduce a voltage of the first DC power; and
a first load configured to receive the first DC power; and
the second power conversion channel comprises:
an H-bridge connected in series with the second rectifier;
a galvanically isolated transformer connected in series with the H-bridge; and
a second load configured to receive the second DC power;
wherein the first DC power comprises a first power and the second DC power comprises a second power, the second power is greater than the first power.

11. The EPS of claim 10, wherein the first power conversion channel comprises a first buck converter configured to reduce a voltage of the first DC power, and the second power conversion channel comprises a second buck converter configured to reduce a voltage of the second DC power.

12. The EPS of claim 11, wherein the first DC power and the second DC power are received by the first load.

13. The EPS of claim 11, wherein the second power conversion channel further comprises a third buck converter coupled in parallel with the second buck converter.

14. The EPS of claim 13, wherein the second power conversion channel further comprises a fourth buck converter coupled in parallel with the second buck converter.

15. The EPS of claim 13, wherein the first power conversion channel comprises a first voltage and the second power conversion channel comprises a second voltage.

16. A method for generating electric power, comprising:
rotating a rotor of a permanent magnet synchronous machine (PMSM);
generating, via the PMSM, an AC power in response to the rotating;
generating, via a first power conversion channel, a first DC power utilizing the AC power, wherein the first DC power comprises a first power, and the first power conversion channel is connected to the PMSM and is configured to receive the AC power; and
generating, via a second power conversion channel, a second DC power utilizing the AC power, wherein the second DC power comprises a second power, and the second power conversion channel is connected to the PMSM and is configured to receive the AC power;
wherein the second power is greater than the first power,
the first power conversion channel and the second power conversion channel are connected in parallel,
the first power conversion channel comprises a first rectifier configured to generate the first DC power utilizing the AC power, and the second power conversion channel comprises a second rectifier configured to generate the second DC power utilizing the AC power,
the first power conversion channel comprises:
a first buck converter configured to reduce a voltage of the first DC power; and
a first load configured to receive the first DC power; and
the second power conversion channel comprises:
an H-bridge connected in series with the second rectifier;
a galvanically isolated transformer connected in series with the H-bridge; and
a second load configured to receive the second DC power.

* * * * *